United States Patent
McLellan et al.

(10) Patent No.: US 9,511,281 B1
(45) Date of Patent: Dec. 6, 2016

(54) BEGINNER'S OFFER VIA INVENTORY ITEM PACK

(71) Applicant: KABAM, INC., San Francisco, CA (US)

(72) Inventors: Sam McLellan, San Francisco, CA (US); Luc Pieron, San Francisco, CA (US); Stephanie Schultz, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 218 days.

(21) Appl. No.: 14/288,085

(22) Filed: May 27, 2014

(51) Int. Cl.
*A63F 13/00* (2014.01)
*A63F 13/30* (2014.01)

(52) U.S. Cl.
CPC .................................... *A63F 13/12* (2013.01)

(58) Field of Classification Search
None
See application file for complete search history.

(56) References Cited

U.S. PATENT DOCUMENTS

| | | | | |
|---|---|---|---|---|
| 6,119,229 A * | 9/2000 | Martinez | ............... | A63F 13/12 726/28 |
| 6,591,250 B1 * | 7/2003 | Johnson | ............... | G06Q 30/06 380/30 |
| 7,713,116 B2 * | 5/2010 | Keam | ............... | A63F 13/12 273/108.1 |
| 8,226,472 B2 * | 7/2012 | Van Luchene | ......... | A63F 13/10 463/25 |
| 2008/0220876 A1 * | 9/2008 | Mehta | ............... | A63F 13/12 463/42 |

OTHER PUBLICATIONS

"Mailboxes—WoWWiki—Your guide to the World of Warcraft", printed from http://www.wowwiki.com/Mailboxes, May 27, 2014, 3 pages.

* cited by examiner

*Primary Examiner* — Sunit Pandya
(74) *Attorney, Agent, or Firm* — Sheppard Mullin Richter & Hampton LLP

(57) ABSTRACT

A system and method for offering virtual items for sale in a user inventory interface.

12 Claims, 4 Drawing Sheets

BEGINNER'S OFFER VIA INVENTORY ITEM PACK

FIELD OF THE DISCLOSURE

This disclosure relates to offering to sell virtual items in a user interface depicting the inventory of a user of a virtual world, where said interface is separate and discrete from a user interface depicting items for sale in a virtual shop.

BACKGROUND

Offering to sell virtual items to users is known; however, conventional systems and methods offer to sell items to users in a shop interface. Virtual items are not offered for sale in a user interface depicting a user's inventory.

SUMMARY

One aspect of the disclosure relates to a system configured to provide a game space, in accordance with one or more implementations. Users of game spaces may utilize virtual items. Virtual items may be associated with particular attributes that may affect users' interaction with the game space. Virtual items may be obtained by obtaining objectives in the game space. Virtual items may also be obtained by defeating enemies within the game space. Virtual items may furthermore be obtained by purchase in the game space. In some implementations, the system may include one or more servers. The server(s) may be configured to communicate with one or more client computing platforms according to a client/server architecture. The users may access the system and/or the game spaces via the client computing platforms, in for instance, one or more games.

The server may be configured to execute one or more computer program components. The computer program components may include one or more of a game component, an inventory component, a shop component, a user component, and/or other components.

The game component may be configured to execute an instance of a game space. The game component may be configured to implement the instance of the game space to facilitate participation by users in a game within the game space by determining view information from the instance and transmitting the view information to the client computing platforms associated with the users. The view information may facilitate the presentation of views of the game space to the users by the client computing platforms.

An inventory component may be configured to display the contents of a user's inventory. An inventory may contain one or more virtual items, including probability item bundles, that are worn by a user, carried by the user, in a user's storage area, in a user's bank, in a user's bag, and/or other locations where a user's virtual items may be stored. Virtual items in a user's inventory may not belong to a user until purchased and/or redeemed. One or more virtual items depicted in a user's inventory may be an offer to sell one or more items to the user. An inventory component may also be configured to determine one or more items that may be beneficial to a user.

A shop component may be configured to offer one or more virtual items for sale, including, probability item bundles, in exchange for real currency, virtual currency, and/or other forms of consideration.

A user component may be configured to track the activity of game space users. The user module may generate a profile for each user of the game space. The user profiles may include, for example, information identifying users (e.g., a username or handle, a number, an identifier, and/or other identifying information) within the game space, security login information (e.g., a login code or password), game space account information, subscription information, virtual currency account, user inventory, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
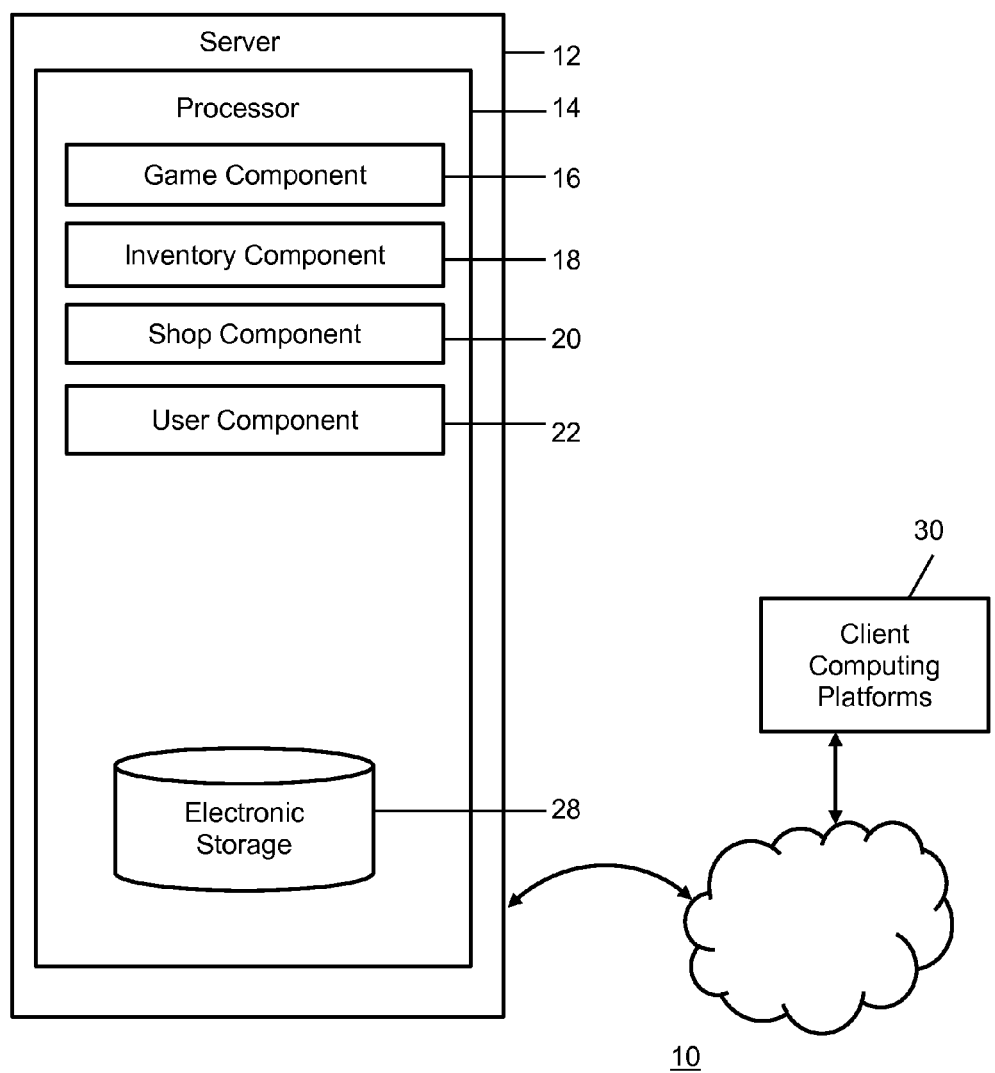
FIG. 1 illustrates a system configured to provide a game space, in accordance with one or more implementations.

FIG. 1 illustrates a system 10 configured to provide a game space to users. Providing the game space may include hosting the game space over a network. In some implementations, system 10 may include a server 12. Server 12 may be configured to communicate with one or more client computing platforms 30 according to a client/server architecture. Users may access system 10 and/or the game space via client computing platforms 30.

It should be appreciated that although components 16, 18, 20, and 22 are illustrated in FIG. 1 as being implemented within a single processing unit, in implementations in which processor 14 includes multiple processing units, one or more of components 16, 18, 20, and 22 may be implemented remotely from the other components. In implementations in which processor 14 includes multiple processing units, one or more of components 16, 18, 20, and 22 may be implemented remotely from the other components in various combinations. The description of the functionality provided by the different components 16, 18, 20, and 22 described below is for illustrative purposes, and is not intended to be limiting, as any of components 16, 18, 20, and 22 may provide more or less functionality than is described. For example, one or more of components 16, 18, 20, and 22 may be eliminated, and some or all of its functionality may be provided by other ones of components 16, 18, 20, and 22. As another example, processor 14 may be configured to execute one or more additional components that may perform some or all of the functionality attributed below to one of components 16, 18, 20, and 22.

The server 12 may be configured to execute one or more computer program components. The computer program components may include one or more of a game component 16, inventory component 18, shop component 20, user component 22, and/or other components.

Game component 16 may be configured to implement an instance of the game space executed by the computer components. In some cases, the instance of the game space may reflect the state of the game space. The instance of the game space may be used to push state information to clients (e.g., client computing platforms 30) for implementation on the client, may be used to verify state information generated on client executing expressions of the instance locally, and/or for other purposes. State information may include information about the state of the game space such as, without limitation, position information of one or more objects, topography information, object status/shape information, battle information, score information, user or character progress information, user inventory information, user or character resource information, progress information for one or more activities or actions, view information describing a view of the game space, and/or other information that describes the state of the game space. Expressions of the instance executed on the client facilitate presentation of views on the client of the game space. Expressions of the instance executed on the client may be configured to simply present views of the game space based on the state information (e.g., via streaming view information, object/position information, and/or other state information) received from game component 16. Expressions of the instance executed on the client may include space logic that effectively provides for execution of a limited version of the instance on a client that is synchronized and/or verified with state information received from game component 16. The view presented on a given client may correspond to a location in the game space (e.g., the location from which the view is taken, the location the view depicts, and/or other locations), a zoom ratio, a dimensionality of objects, a point-of-view, and/or view parameters. One or more of the view parameters may be selectable by the user.

The instance of the game space may comprise a simulated space that is accessible by users via clients that present the views of the game space to a user. The simulated game space may have a topography, express ongoing real-time interaction by one or more users, and/or include one or more objects positioned within the topography that are capable of locomotion within the topography. In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the game space may comprise one or more user achievements. In a game space such as an online game, a user achievement may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, defeating an enemy or enemies, rescuing an ally or allies, completing a mission or quest, and/or other actions. For example, in a game space involving building virtual structures, a user achievement may be associated with building, upgrading, and/or repairing a building or buildings. In an example involving a game space with an aspect related to the development of a character, a user achievement may be associated with using melee attack or a spell; interacting with another player and/or a non-player character; defeating an enemy or enemies; and/or rescuing an ally or allies. In an example involving a game space with an aspect related to the development of an army, a user achievement may be associated with winning a battle, developing an army to a certain size, and/or sustaining a minimal number of losses during a battle.

Within the instance of the game space executed by game component 16, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

Users may participate in an instance of a game space by controlling one or more of the available user controlled elements in the game space. Control may be exercised through control inputs and/or commands input by the users through client computing platforms 30. In some implementations user controlled elements may include units, structures, and/or other controllable elements. In some implementations, such as simulated battle, a user's goal may be to defeat an opposing force's units, structures, and/or other elements. In some implementations, units, structures, or units and structures may have combat attributes representative of a unit or structure's effectiveness in categories of attributes related to combat.

In some implementations a game space user may use and/or interact with virtual items within a virtual game space. In some implementations a virtual item may have attributes and/or characteristics that distinguish that virtual item from other similar virtual items. For example, in some instances, a user may equip an avatar with a virtual sword. An exceptional quality virtual sword may have a damage rating of 100, and a common quality virtual sword may have a damage rating of 50. In some instances, a user may equip an avatar with virtual armor. Common quality virtual armor may have a protection rating of 50, and poor quality virtual armor may have a protection rating of 10. In some implementations when a user equips and/or uses a virtual item, the user may benefit from the particular attributes of that virtual item.

In some instances users may engage in fictional battle against enemies. In some instances the amount of damage a user is able to deal and withstand may be dependent on the quality of their equipped weapon and armor. In some instances, a user equipped with an exceptional quality virtual sword may be able to affect greater damage on an enemy with each attack than if the same user was equipped with a common quality virtual sword. In some instances a user equipped with common quality virtual armor may be able to withstand greater damage from an enemy than if the same user was equipped with poor quality virtual armor.

In some instances of simulated combat damages may include an elemental attribute such as fire damage, cold damage, and/or other elemental types of damage. In some implementations weapons the particular attributes of a type of virtual item may include elemental characteristics. In some implementations a sword of fire may affect fire damage to an enemy with every attack. In some implementations an armor of ice may include increased resistance to ice elemental damage.

In some implementations of simulated combat a user's character or avatar may be associated with attributes that affect their combat characteristics such as strength, agility, health and/or other attributes. In some implementations virtual items may modify a character's combat characteristics. In some implementations boots of quickness may increase character's agility when equipped. In some implementations armor of health may increase a character's health when equipped. Other embodiments are envisioned.

Virtual items may be a type of item that may be useful to a user's character in a virtual game space, such as: helms, necklaces, amulets, earrings, spaulders, chestpieces, shirts, jackets, capes, gloves, belts, pants, dresses, leggings, socks, boots, rings, swords, guns, shields, grenades, batons, bows and arrows, quivers, medicines, tonics, foodstuffs, health packs, curios, gadgets, baubles, pets, vehicles, building materials, supplies, building plans, resources, and/or other virtual items.

In some implementations game space users may be able to purchase virtual items in exchange for consideration. In some implementations users may be able to purchase one or more virtual items grouped in a probability item bundle. In some implementations the exact contents of a probability item bundle may be unknown to a user at the time of purchase. These probability item bundles may be associated with a set of one or more individual potential awards that could be actually awarded in the probability item bundle upon activation of the probability item bundle. In some implementations the individual potential awards of the probability item bundle may be known to the user. In some implementations the actual award of the probability item bundle are not revealed to the user until after the user purchases the probability item bundle. The one or more individual potential awards in the probability item bundle may be associated with one or more distribution probabilities that affect the likelihood that the one or more individual potential awards will be actually awarded in the probability item bundle at the time of activation.

In a game space simulating combat, such as battle between two armies, units may be mobile elements able to traverse a game space battlefield. Units may be able to deal damage to an opposing force's units, structures, and/or other elements. Units may be able to sustain damage from an opposing force's units, structures, and/or other elements. Units may have a fixed or variable amount of life points representing their health. If a unit's life points are completely depleted, a unit may be destroyed. Units may be directed to perform tasks including moving, patrolling, attacking, defending, garrisoning, and/or other tasks. In some implementations a user may, for example, direct units to move from a user's base to an opposing force's base to attack the opposing force. In some implementations a user may, for example, station units in between an opposing force's base and a user's base to defend the user's base from the opposing force.

Units may include personnel, mechanical vehicles, and or other elements. Units may include non-combat units such as medics, workers, engineers, transports, and/or other non-combat units. Units may include combat units such as infantry, swordsmen, archers, riflemen, grenadiers, anti-aircraft infantry, heavy assault troopers, sappers, snipers, spies, special forces, heroes, cavalry, scouts, siege engines, anti-personnel vehicles, anti-armor vehicles, anti-aircraft vehicles, helicopters, fighter jets, aircraft interceptors, bombers, naval vessels, and/or other combat units. Both non-combat units and combat units may have combat attributes such as life points and/or the ability to deal damage to and opposing force's units, structures, and/or other elements.

In implementations where units are personnel, a user may train units from a game space barracks. In implementations where units are ground-based mechanized vehicles, a user may create units from a game space factory. In implementations where units are ships, a user may create units from a shipyard. In implementations where units are aircraft, a user may create units from an airfield.

In some implementations, a user may be able to control structures. User controlled structures may serve purposes such as generating units, bestowing special abilities, defending territory, and/or other purposes. In some implementations it may be a goal of a game to defend a position, structure, and/or other location. Users may, in some cases, use combat structures, non-combat structures, and/or other structures to achieve a goal of a game. In some instances, a user may use structures with an offensive capability to defend a location in a game. Structures with an offensive capability include, for example, guard posts, guard towers, sentry towers, keeps, pillboxes, anti-aircraft emplacements, artillery emplacements, and/or other combat structures. In some instances, a user may use structures without an offensive capability to defend a location in a game. Structures without an offensive capability include, for example, gates, fences, walls, barbed wire, bollards, watch towers, and/or other non-combat structures.

In some implementations upgrades may be available to a user. Upgrades may include upgrades for units, upgrades for structures, and/or other upgrades. In some implementations, upgrades may include removing limitations on garrisoning units in structures. For example, in some implementations a user may be able to increase a maximum number of units that may be garrisoned, increase a maximum number of a type of unit that may be garrisoned, increase a maximum benefit to the combat attributes of a structure, increase maximum limit to the types of units that may be garrisoned, increase a maximum rate at which units may be garrisoned, remove a limitation on the time during which units may be garrisoned, remove a limitation on the times units may be garrisoned, remove a limitation on the types of units that may be garrisoned, and/or remove other limitations. A person of skill in the art appreciates that the exemplary limitations may be limitations for a particular structure, type of structure, user, team, guild, and/or other bases of implementing limitations. A person of skill in the art appreciates that removing limitations may be done in relation to a particular structure, type of structure, user, team, guild, and/or other basis of implementing limitations.

Users may purchase units, structures, upgrades, and/or other elements using real currency, virtual currency, virtual resources, and/or other resources. In a game space, virtual resources may be virtual commodities. Users may acquire resources, spend resources, trade resources, invest resources, consume resources, harvest resources, loot resources, transform resources, and/or perform other tasks relating to virtual resources. Virtual resources may include, for example, minerals, gas, gold, currency, metal, parts, ammunition, energy, and/or other virtual resources.

In some implementations, a user may harvest a mineral resource from a battlefield by using worker units to retrieve the mineral from a mine and depositing it in a refinery structure. In some implementations, a user may harvest a gas resource from a battlefield by using worker units to retrieve the gas from a well and depositing it in a refinery structure. In some implementations, a user may loot a mineral resource from a destroyed worker unit of an opposing force. In some implementations, a user may transform a harvested metal resource into a part resource.

In some implementations a user may exchange minerals, gas, and/or other virtual resources for units, structures, and/or other elements. In some implementations a user may exchange minerals, gas, and/or other virtual resources for other types of resources. In some implementations the act of garrisoning a unit in a structure requires spending virtual resources. In some implementations, the operation of a structure, unit, and/or other element requires spending virtual resources.

Inventory component 18 may be configured to display an inventory interface showing items, units, structures, resources, upgrades, in-game benefits, and/or other elements that a user may control, summon, and/or deploy in the game space. In some implementations, an inventory interface may display items, units, structures, resources, upgrades, in-game benefits, and/or other elements that the user may not control, summon, and/or deploy in the game space until completing the purchase of an offer using real currency, virtual currency, virtual resources, and/or other resources. In some implementations these items, units, structures, resources, upgrades, in-game benefits, and/or other elements will be displayed in the same interface as items, units, structures, resources, upgrades, in-game benefits, and/or other elements that the user can control, summon, and/or deploy. In some implementations the ability to control, summon, and/or deploy items, units, structures, resources, upgrades, in-game benefits, and/or other elements will be made available to a user upon or after acceptance of an offer for the items, units, structures, resources, upgrades, in-game benefits, and/or other elements in exchange for real currency, virtual currency, virtual resources, and/or other resources. The offer may be to sell, rent, and/or lease the items, units, structures, resources, upgrades, in-game benefits, and/or other elements.

In some implementations one or more of the offers may be particularly useful for the user at the time. In some implementations one or more of the offers may be based on the user's progress in the game. In some instances, users may require specific items to complete a challenge in a game space. In some instances, the items offered for sale in a user's inventory may be useful for the user in completing a challenge. In some instances, the items offered for sale in a user's inventory may be one or more items needed to complete a challenge. In some instances one or more items may have limited availability. Availability may be based on a time limit, previous purchases by the user, previous purchases by other users, the rate of purchases, and/or other factors.

In some implementations one or more of the offers for items, units, structures, resources, upgrades, in-game benefits, and/or other elements may be for items, units, structures, resources, upgrades, in-game benefits, and/or other elements that the user has not previously been able to control, summon, and/or deploy in the game space. In some implementations one or more of the offers for items, units, structures, resources, upgrades, in-game benefits, and/or other elements may be for items, units, structures, resources, upgrades, in-game benefits, and/or other elements that the user has previously been able to control, summon, and/or deploy in the game space.

In some instances a user inventory interface may be accessible by a user at any time in the game space. In some instances, items offered for sale in a user inventory game space may cost more than if purchase from a shop interface. In some instances the increased cost may be based on the convenience of being able to purchase the game element immediately from the user interface. In some instances, the increased cost may be dynamically adjusted based on the convenience of being able to purchase the game element immediately from the user interface.

For example, in some instances, a user may require a potion to complete a quest. The potion may be purchased from a vendor located a remote distance from the user. In some instances, a user may be presented with an offer to purchase the potion immediately in the user's inventory interface. In some instances, this potion may cost the user a greater amount of resources or currency than if the user had purchased the potion from the vendor.

Shop component 20 may be configured to display offers for items, units, structures, resources, upgrades, in-game benefits, and/or other elements that a user may not control, summon, and/or deploy in the game space until completing the purchase of an offer using real currency, virtual currency, virtual resources, and/or other resources. The offer may be to sell, rent, and/or lease the items, units, structures, resources, upgrades, in-game benefits, and/or other elements. The offers may be presented in a shop interface. In some instances a shop interface may only be accessible at specific times or locations in the game space.

The user component 22 may be configured to access and/or manage one or more user profiles and/or user information associated with users of the system 10. The one or more user profiles and/or user information may include information stored by server 12, one or more of the client computing platforms 30, and/or other storage locations. The user profiles may include, for example, information identifying users (e.g., a username or handle, a number, an identifier, and/or other identifying information) within the game space, security login information (e.g., a login code or password), game space account information, subscription information, virtual currency account information (e.g., related to currency held in credit for a user), relationship information (e.g., information related to relationships between users in the game space), game space usage information, demographic information associated with users, interaction history among users in the game space, information stated by users, purchase information of users, browsing history of users, a client computing platform identification associated with a user, a phone number associated with a user, user inventory information, and/or other information related to users.

In some implementations a user component may manage and/or track virtual currency account information associated with a user of a game space. Virtual currency account information for a user of a game space may include: virtual currency balance, real currency balance, resource balance, and/or other metrics associated with a virtual currency account of a game space user.

In some implementations a user component may manage and/or track the virtual item inventory associated with a user of a game space. Virtual item inventory information may include: the type of items in a user inventory, the number of items in a user inventory, the quality of items in a user inventory, and/or other characteristics of items in a user inventory.

Users may interact with each other through communications exchanged within the game space. Such communications may include one or more of textual chat, instant messages, private messages, voice communications, and/or other communications. Communications may be received and entered by the users via their respective client computing platforms 30. Communications may be routed to and from the appropriate users through server 12 (e.g., through game component 16).

The above description of the views of the game space determined from the instance executed by game component 16 is not intended to be limiting. The game space may be presented in a more limited, or more rich, manner. For example, views of the game space may be selected from a limited set of graphics depicting an event in a given place within the game space. The views may include additional content (e.g., text, audio, pre-stored video content, and/or other content) that describes particulars of the current state of the place, beyond the limited set of graphics. For example, a view may include a generic battle graphic with a textual description of the opponents to be confronted. Other representations of individual places within the game space are contemplated.

In some implementations, the server 12 and client computing platforms 30 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12 and client computing platforms 30 may be operatively linked via some other communication media.

A given client computing platform 30 may include one or more processors configured to execute computer program components. The computer program components may be configured to enable an expert or user associated with the given client computing platform 30 to interface with server 12, and/or provide other functionality attributed herein to client computing platforms 30. By way of non-limiting example, the given client computing platform 30 may include one or more of a desktop computer, a laptop computer, a handheld computer, a tablet computing platform, a NetBook, a Smartphone, a gaming console, and/or other computing platforms.

Server 12 may include electronic storage 28, one or more processors 14, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 28 may comprise non-transitory storage media that electronically stores information. The electronic storage media of electronic storage 28 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 14, information received from server 12, information received from client computing platforms 30, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include a plurality of processing units. These processing units may be physically located within the same device, or processor 14 may represent processing functionality of a plurality of devices operating in coordination. The processor 14 may be configured to execute components 16, 18, 20, and 22. Processor 14 may be configured to execute components 16, 18, 20, and 22 by software; hardware; firmware; some combination of software, hardware, and/or firmware; and/or other mechanisms for configuring processing capabilities on processor 14. As used herein, the term "component" may refer to any component or set of components that perform the functionality attributed to the component. This may include one or more physical processors during execution of processor readable instructions, the processor readable instructions, circuitry, hardware, storage media, or any other components.

Figure 2:
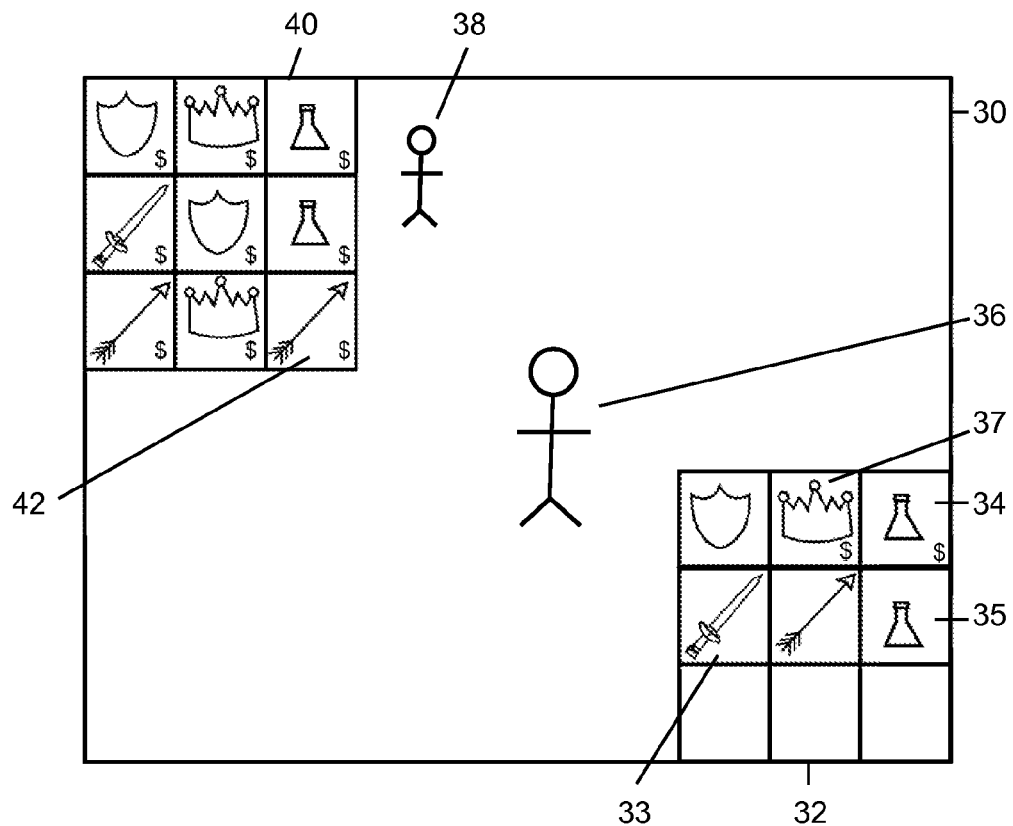
FIG. 2 illustrates a game space view with an inventory interface and a shop interface with items for sale to the user.

FIG. 2 illustrates offers to sell items in an inventory interface 32 and shop interface 40. A view 30 of a game space is presented to a user. A user's avatar 36 may be associated with a user inventory. A user inventory may be displayed in a user inventory interface 32 in the game space view 30. The user inventory interface 32 may display one 33 or more items in the user's inventory. In some implementations, a user inventory interface 32 may present one 34 or more 37 offers to sell an item to the user. The offer 34 may be for an item that the user already possesses 35, or the offer 37 may be for an item that the user does not possess. In some implementations a shop interface 40 may be initiated by interacting with a seller 38 in a game space view 30. The shop interface may contain one 42 or more offers to sell items to a user.

Figure 3:
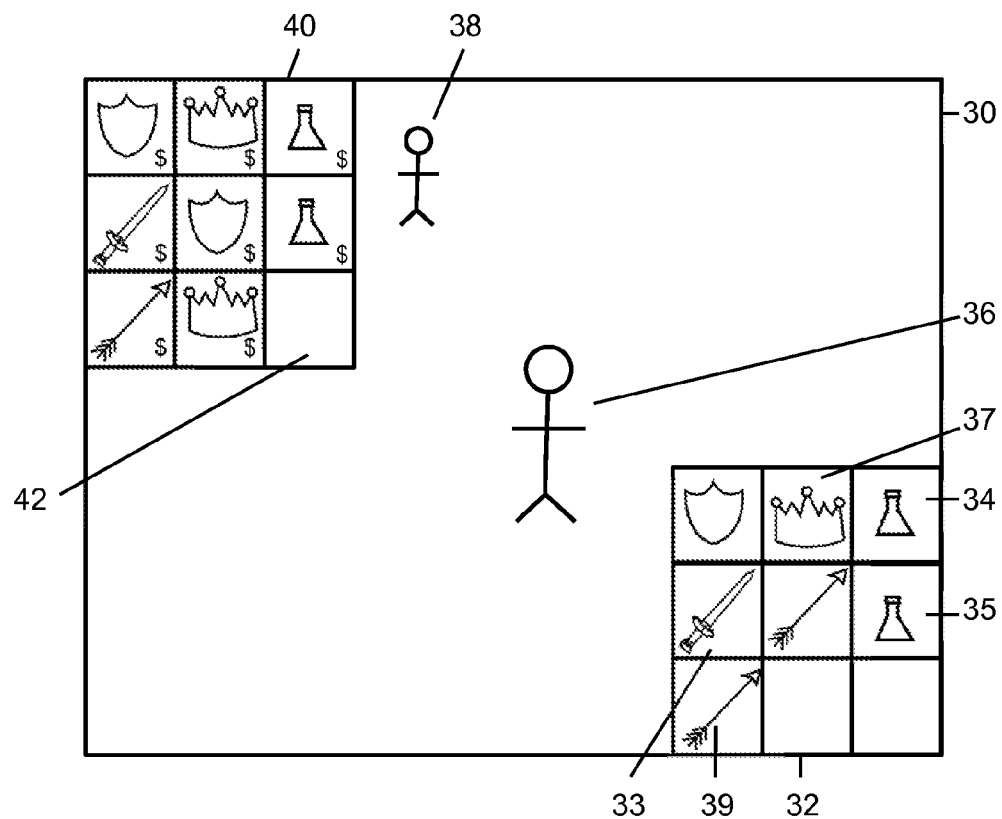
FIG. 3 illustrates a game space view with an inventory interface and a shop interface after items have been purchased from an inventory and shop interface.

FIG. 3 illustrates the result of item purchases from an inventory interface 32 and shop interface 40. View 30 of a game space may be presented to a user. A user's avatar 36 may be associated with a user inventory. A user inventory may be displayed in a user inventory interface 32 in the game space view 30. When one or more offers to sell items are accepted by the user, the user inventory interface 32 may display items that have been purchased 34 and 37 from an inventory interface 32. Shop interface 40 may display one or more offers to sell items. When one or more items are purchased from a shop interface, the offer 42 may be removed from the interface, and the item 39 may be placed in the user's inventory interface 32.

Figure 4:
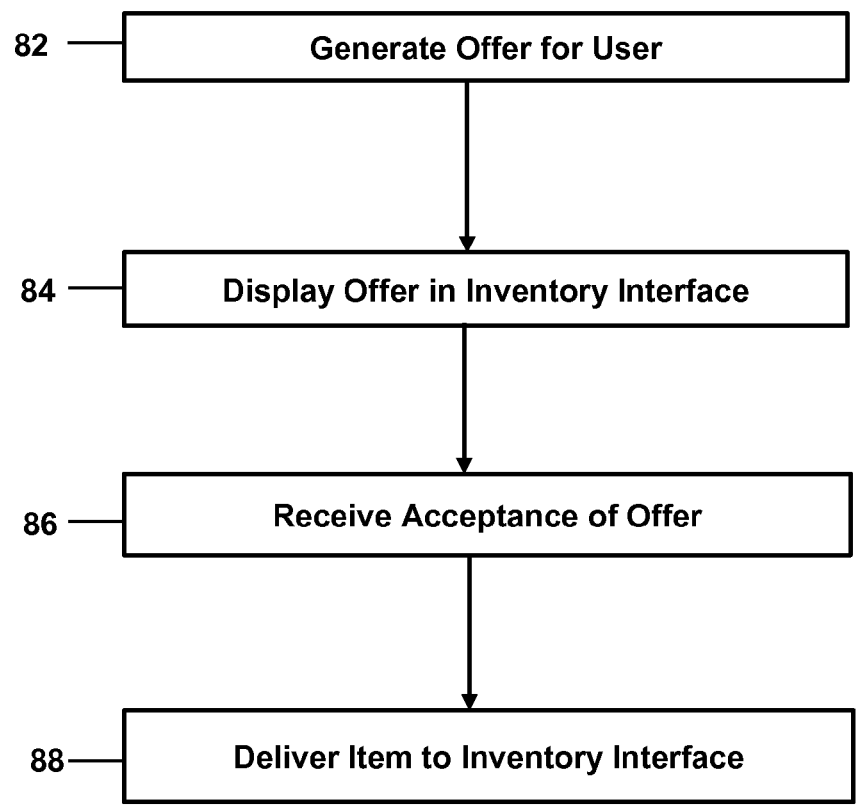
FIG. 4 illustrates a method of offering an item for sale in an inventory interface.

FIG. 4 illustrates a method 80 of generating and accepting an offer for a virtual item from an inventory interface. The operations of method 80 presented below are intended to be illustrative. In some implementations, the method 80 may be accomplished with one or more additional operations not described, and/or without one or more of the operations discussed. Additionally, the order in which the operations of method 80 are illustrated in FIG. 4 and described below are not intended to be limiting.

In some embodiments, method 80 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 80 in response to instructions stored electronically on an electronic storage medium. The one or more processing devices may include one or more devices configured through hardware, firmware, and/or software to be specifically designed for execution of one or more of the operations of method 80.

At an operation 82, an offer is generated for a user of a game space. Operation 82 may be performed by an inventory component that is the same as or similar to inventory component 18, in accordance with one or more implementation.

At an operation 84, an offer is displayed in an inventory interface. Operation 84 may be performed by an inventory component that is the same as or similar to inventory component 18, in accordance with one or more implementation.

At an operation 86, an acceptance of an offer is received. Operation 86 may be performed by an inventory component that is the same as or similar to inventory component 18, in accordance with one or more implementation.

At operation 88, an item corresponding to the offer is delivered to the inventory of the user. Operation 88 may be performed by inventory component that is the same as or similar to user component 18.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that delivers offers to users of an online game, the system comprising:
one or more physical processors configured by machine-readable instructions:
execute an instance of a game space and use the instance to generate game state information that is transmitted over a network to client computing platforms, the game state information facilitating presentation of views of the online game to the users via the client computing platforms, wherein execution of the instance further enables interaction by the users with the online game by performing operations in the instance in response to commands received over the network from the client computing platforms such that users participate in the online game in the game space through the client computing platforms;
effectuate display on a first client computing platform of contents of a first character's inventory within an inventory interface;
effectuate presentation within the inventory interface of an offer to sell instances of one or more virtual items usable in the online game; and
effectuate display on the first client computing platform of a shop interface that is separate and discrete from the inventory interface, the shop interface presenting offers to sell virtual items useable in the online game.

2. A system of claim 1, wherein the offer to sell instances of one or more virtual items displayed in the inventory interface are for items particularly beneficial to the first character.

3. A system of claim 1, wherein one or more of the items offered for sale is a probability item bundle.

4. A system of claim 1, wherein one or more of the items offered for sale in the inventory interface is obfuscated until after the sale.

5. A system of claim 1, wherein one or more of the offers in the inventory interface is for a limited duration.

6. A computer implemented method for delivering offers to users of an online game, the method being implemented in a computer system that includes one or more physical processors executing machine-readable instructions, the method comprising:
executing an instance of a game space and using the instance to generate game state information that is transmitted over a network to client computing platforms, the game state information facilitating presentation of views of the online game to the users via the client computing platforms, wherein execution of the instance further enables interaction by the users with the online game by performing operations in the instance in response to commands received over the network from the client computing platforms such that users participate in the online game in the game space through the client computing platforms;
effectuating display on a first client computing platform of contents of a first character's inventory within an inventory interface;
effectuating presentation within the inventory interface of an offer to sell instances of one or more virtual items usable in the online game; and
effectuating display on the first client computing platform of a shop interface that is separate and discrete from the inventory interface, the shop interface presenting offers to sell virtual items useable in the online game.

7. A method of claim 6, wherein the offer to sell instances of one or more virtual items displayed in the inventory interface are for items particularly beneficial to the first character.

8. A method of claim 6, wherein one or more of the items offered for sale is a probability item bundle.

9. A method of claim 6, wherein one or more of the items offered for sale in the inventory interface is obfuscated until after the sale.

10. A method of claim 6, wherein one or more of the offers in the inventory interface is for a limited duration.

11. A system of claim 1, wherein one or more of the offers are based on a user's progress in the online game.

12. A method of claim 6, wherein one or more of the offers are based on a user's progress in the online game.

\* \* \* \* \*